May 10, 1938. M. L. HALL 2,116,699
FEED DISPENSING APPARATUS FOR POULTRY OR THE LIKE
Filed Jan. 21, 1937
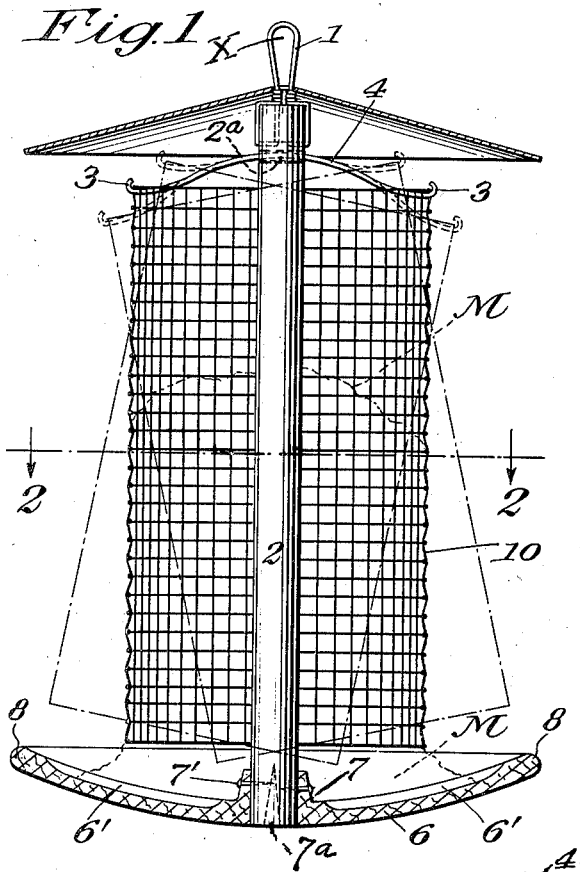
Fig. 1
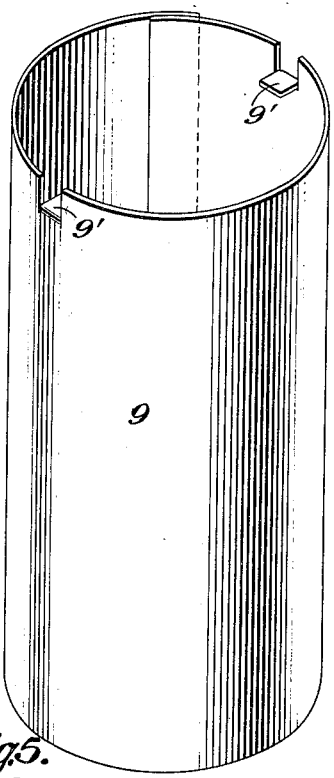
Fig. 3
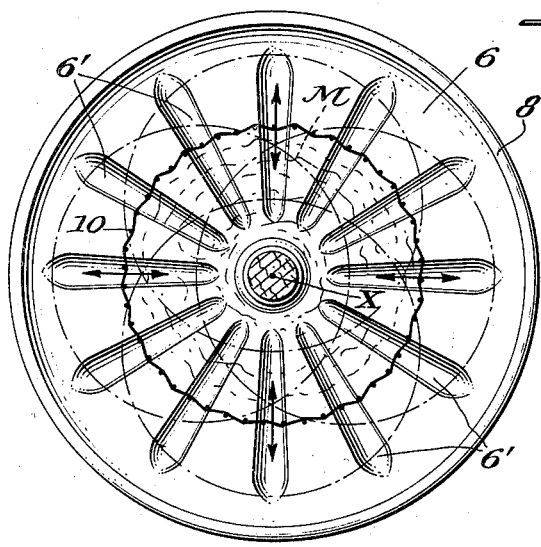
Fig. 2
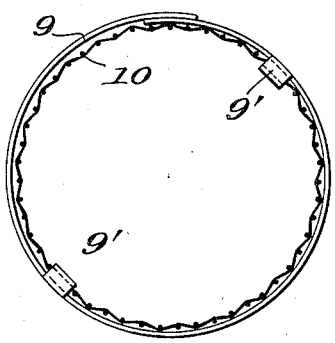
Fig. 5
Fig. 4
INVENTOR.
Martyn L. Hall
BY
Ellie Spearf.
ATTORNEY.

Patented May 10, 1938

2,116,699

UNITED STATES PATENT OFFICE 2,116,699

FEED DISPENSING APPARATUS FOR POULTRY OR THE LIKE

Martyn Ludike Hall, Ellsworth Falls, Maine

Application January 21, 1937, Serial No. 121,440

18 Claims. (Cl. 119—54)

In the feeding of poultry certain mixtures, such as mashes or the like, particularly those of wet or damp character, are of recognized desirability in attaining or maintaining maximum condition of the birds.

Such mashes while eagerly accepted by poultry are, on account of their moisture and adhesiveness, very hard to give service presentation to a flock by mechanical feeders. Ordinary trough, board or pan feeding is wasteful as the feed becomes scattered and contaminated and usually in considerable part lost, especially to any weaker or younger birds, intended to be included, but anticipated by more vigorous or voracious members.

My present invention by its simple concept makes possible gradual self-purging delivery of even quite wet or sticky mixes and without wastage and in reasonable impartiality to size or vigor of contesting feeders.

This I accomplish by a pensile feeder freely movable in almost every combined direction of its effective parts.

To illustrate this I show a simple form which illustrates the principles of my invention, as well as showing a simple, practical and inexpensive embodiment.

Throughout the specification and drawing like reference numerals are employed to indicate corresponding parts, and in the drawing:

Fig. 1 is a central vertical section through a wet mash or like feeder according to my invention.

Fig. 2 is a schematic view in plan indicating some of the pendular movements of the parts relative to their pensile axis.

Fig. 3 shows a detail of a supplemental sleeve which I provide optionally for dry mashes and hard grains, Fig. 4 a section therethrough and Fig. 5 is a fragmentary detail showing the engagement of the clapper stem yoke with the wire mesh of the cage wall.

The theoretical point of suspension X at the center of Fig. 2 is physically a pivoted bail 1 which supports the clapper stem 2 generally centrally vertically axially of a perforate cylindrical shell or foraminous cage wall 10. My feeders are thus suspended slightly above the ground but within easy pecking reach of the birds as they stand on the ground. The relatively light weight of the cage 10 and its lack of resistance to pressure discourages any tendency to roost.

The perforations or interstices are preferably of about one-half inch aperture. The shell may be formed of socalled hardware cloth which is one form of galvanized wire screen. The regular one-half inch mesh I find perfectly satisfactory for mashes that are essentially wet. This gives a cage wall adapted to receive within it a filling, as will be hereinafter described, which in practice is conveniently a full charge ladled into the open top. At this time the mash is crowded about the stem 2 and outwardly against the inner face of the wall on the inner face of which it is more or less temporarily retained, as incompletely suggested at M in the schematic view of Fig. 2.

As the wet mashes are sticky and heavy they cling to any such surface in defiance of gravity unless definitely struck, as a mere jarring of the cage will not produce definite and satisfactory results.

The cage wall 10 is therefore not only pivotally hung on the upturned end bows 3 of the yoke 4, but the whole is movable with reference to the clapper stem 2 which acts as a maul. This is important in the feeding of a wet or moist mass as the mash M roughly indicated in Fig. 2. The upturned end bows 3 of the clapper stem yoke 4 may be simply hooked at any desired distance from the top in the mesh of the wire cage wall 10, as indicated in the detail shown in Fig. 5 of the drawing. The parts by their relative movements tend to effect a gradual but complete purge of the cage wall 10 inwardly toward the clapper stem 2, as will be more fully hereinafter described. The various movements or tendencies are indicated by conventional arrows of direction.

Fixed at the lower end of the clapper stem 2 is a shallow concave member 6 of spherical figure evolved about the suspension point X as a center. Sufficient clearance is given between the lower edge of the cage wall 10 and the member 6 to enable the feeding birds to clear out the bottom layer of mash well in toward the base of the clapper stem 2.

The cage 10 is suspended from the clapper stem 2 by the metal yoke 4 which passes through the aperture 2a near the top of the clapper stem, the end bows being inserted through diametrically opposed interstices near the top of the cage wall 10. The raising or lowering of the cage wall 10, with reference to the position of the clapper stem 2 and feed dish 6 is accomplished by inserting the end bows 3 in a lower or higher mesh of the cage wall 10, or, to a lesser degree, by bending up or down on the metal yoke 4.

By properly proportioning the radius of the spherically curved pendulum disc 6 I make of it an effective receiver for the mash as it discharges through the open bottom of the cylinder wall 10.

As it extends beyond that wall it provides a more or less conventional annular trough from which the birds may feed if food is present. The contact perimeter of this trough may be rolled or otherwise blunted or shielded to protect the bodies of the feeding fowls.

When the trough containing the bottom layer of mash has been emptied, the individual members of the flock become contestants in pecking at the mash through the interstices of the wire cage. They thus each tend by bill thrusts to peck off particles of mash. Any falling, as a result of the blows of the bills of the feeding birds, will descend chiefly on the inside of the cage wall 10, into the upper concavity of 6 for the common good. In doing this the more eager and vigorous birds breast the perimeter or bumper 8, at the edge of 6. The pendulum disc may be of any material desired. It preferably should be non-corroding and capable of being detached as at 7¹ and washed or sterilized.

Centrally of the concavity I preferably form a short upstanding tube or receiver 7 for the end of the clapper stem 2 into which it may be pinned by radial fastenings 8, or permanently wedged for some uses as at 7ª.

As indicated in the schematic plan or diagrammatic view of Fig. 2, the cage 10 has its own pivotal movements relative to the clapper stem 2. This and the other indicated relative movements assure the internal mauling or striking or pounding of the mash or like clinging food M.

These and the other indicated relative movements assure the internal mauling of the mash or like clinging food M to break up the charge. The external pecking activities of the birds by beak-thrusts penetrate the open mesh of the wire cage and knock the wire cage against the enclosed mash and stem 2. Any movement of the clapper stem 2 and attached disc 6 that will throw it off center will result in pressing the opposite side of the cage wall 10 against the residue of mash, enabling the birds on that side to continue their attack on the feed through the meshes of the cage wall 10.

In use, the poultry pick out the feed from between the meshes and under the lower edge of the wall 10 which gradually undermines the food above and gives it a chance to be crumbled down by the blows of the resilient cage 10 as it is buffeted back and forth between opposing hens. At the same time the pendulum stem acts as a churning agent internally. In this action it will be noted that the lighter basket becomes more easily buffeted or moved while the clapper stem still has lag due to its weight.

When the last morsels of food have been thus knocked down and have fallen into the upper face concavity of the member 6, the fowl merely push the light wire over with their heads and eat it up to the last crumb without any waste.

In some instances, and for some special types of feed, I may encase my entire cage wall 10 with a closely fitting casing 9 of sheet metal which can be sprung into place and held in position by small projections 9¹ bent in from the top edge of the sheet metal. Or, I may encase the entire cage wall 10 with any other covering so placed, and so adjusted that it will better contain finer and drier feed substances, without in any way hindering the working principles of my invention.

As indicated in Figs. 1 and 2 I may form the concaved upper surface of my pendulum disc 6 with shallow radial grooves 6¹. These preferably taper or flare in width from the center outwardly to approximately its outer side wall where they merge gradually at their ends into its upward curvature.

The cylindrical form of cage shown is most efficient on account of its symmetry, but might be of slightly modified figure as in octagonal and other plural sided forms. Such, however, do not purge as freely and are less resilient than the simple cylindrical form.

Various modifications may, of course, be made in materials and design, but such are to be understood as within the interest of the appended claims.

What I therefore claim and desire to secure by Letters Patent is:—

1. A pensile poultry feeder for automatic service presentation of feeds including wet mashes or like mixes to poultry feeding from ground stances, comprising an open bottom foraminous cage having a resilient feeding wall, means for pivotally and eccentrically supporting the cage, a pendulum clapper-stem freely suspended at its upper end above the cage top and extending freely centrally axially through the cage, and a disc-like member having a concavity on its upper face, and rigidly fixed on the lower end of the stem so as to be freely swingable relative to the bottom cage edge and to the point of suspension, whereby said pendulum stem with its loaded disc as a gravity pestle and said resilient cage mutually yieldingly resistant to the birds in feeding, may coactively buffet the enclosed feed.

2. A pensile poultry feeder for automatic service presentation of mashes or like mixes to poultry feeding from ground stances, comprising an open bottom foraminous cage having a resilient feeding wall, means for pivotally and eccentrically supporting the cage, a pendulum clapper-stem freely suspended at its upper end above the cage top and extending freely axially through the cage, and a shallow feed pan fixed on the lower end of the stem so as to be freely movable relative to the bottom cage edge and to the point of suspension, whereby said pendulum stem with its loaded feed pan as a gravity pestle and said resilient cage mutually yieldingly resistant to the birds in feeding, may coactively buffet the enclosed feed.

3. A pensile poultry feeder for automatic service presentation of mashes or like mixes to poultry feeding from ground stances, comprising an open bottom foraminous cage having a resilient feeding wall, means for pivotally and eccentrically supporting the cage, a pendulum clapper-stem freely suspended at its upper end above the cage top and extending freely axially through the cage, and a shallow feed pan having upturned sides, and detachably fixed on the lower end of the stem so as to be freely radially movable relative to the bottom cage edge and to the point of suspension, whereby said pendulum stem with its loaded disc as a gravity pestle and said resilient cage mutually yieldingly resistant to the birds in feeding, may coactively buffet the enclosed feed.

4. A pensile poultry feeder for automatic service presentation of mashes or like mixes to poultry feeding from ground stances, comprising an open bottom, open top foraminous cage having a resilient feeding wall, means for pivotally and eccentrically supporting the cage, a pendulum clapper-stem freely suspended at its upper end above the cage top and extending freely centrally axially through the cage, said pivot support including a bowed yoke freely slidable through said stem below its point of pivotal support and above the upper end of the cage and pivotally engaged with the cage wall adjacent said upper end, and a shallow feed delivery pan rigidly fixed on the lower end of the stem so as to be freely movable relative to the bottom cage edge and to the point of suspension, whereby said pendulum stem with its loaded feed pan as a gravity pestle and said resilient cage mutually yieldingly resistant to the birds in feeding, may coactively buffet the enclosed feed.

5. A pensile poultry feeder for automatic service presentation of mashes or like mixes to poultry feeding from ground stances, comprising an open bottom, open top foraminous cage having a resilient feeding wall, means for pivotally and eccentrically supporting the cage, a displaceable cover for shielding the cage and above its suspension pivot, a pendulum clapper-stem freely suspended at its upper end above the cage top and extending freely centrally axially through the cage, and a shallow feed delivery pan rigidly fixed on the lower end of the stem so as to be freely movable relative to the bottom cage edge and to the point of suspension, whereby said pendulum stem with its loaded feed pan as a gravity pestle and said resilient cage mutually yieldingly resistant to the birds in feeding, may coactively buffet the enclosed feed.

6. A pensile poultry feeder for automatic service presentation of mashes or like mixes to poultry feeding from ground stances, comprising an open bottom, foraminous cage having a resilient feeding wall, means for pivotally and eccentrically supporting the cage, a pendulum clapper-stem freely suspended at its upper end above the cage top and extending freely centrally axially through the cage, and a pendulum disc having a spherically concaved upper surface forming a shallow feed delivery, a central hollow boss, fixed on the lower end of the stem so as to be freely movable relative to the bottom cage edge and to the point of suspension, whereby said pendulum stem with its loaded disc as a gravity pestle and said resilient cage mutually yieldingly resistant to the birds in feeding, may coactively buffet the enclosed feed.

7. A pensile poultry feeder for automatic service presentation of mashes or like mixes to poultry feeding from ground stances, comprising an open bottom, foraminous cage having a resilient feeding wall, means for pivotally and eccentrically supporting the cage, a pendulum clapper-stem freely suspended at its upper end above the cage top and extending freely centrally axially through the cage, and a pendulum disc having a spherically concaved upper surface forming a shallow feed delivery, a central hollow boss having externally conic walls merging in the spherical curvature of the disc concavity and fixed on the lower end of the stem so as to be freely radially movable relative to the bottom cage edge and to the point of suspension, whereby said pendulum stem with its loaded disc as a gravity pestle and said resilient cage mutually yieldingly resistant to the birds in feeding, may coactively buffet the enclosed feed.

8. A pensile poultry feeder for automatic service presentation of mashes or like mixes to poultry feeding from ground stances, comprising an open bottom, foraminous cage having a resilient feeding wall, means for pivotally and eccentrically supporting the cage, a pendulum clapper-stem freely suspended at its upper end above the cage top and extending freely centrally through the cage, and a pendulum disc member having a concaved upper surface and forming a shallow feed delivery having a rounded edge, said edge constituting a peripheral buffeting rail for the birds in pressing against it, and movable relative to the bottom cage edge and to the point of suspension, whereby said pendulum stem with its loaded disc as a gravity pestle and said resilient cage mutually yieldingly resistant to the birds in feeding, may coactively buffet the enclosed feed.

9. A pensile poultry feeder for automatic service presentation of mashes or like mixes to poultry feeding from ground stances, comprising an open bottom, foraminous cage having a resilient feeding wall, means for pivotally and eccentrically supporting the cage, a pendulum clapper-stem freely suspended at its upper end above the cage top and extending freely centrally through the cage, and a pendulum disc member having a concaved upper surface and forming a shallow feed delivery having a rounded edge, and rigidly fixed on the lower end of the stem so as to be freely movable relative to the bottom cage edge and to the point of suspension, whereby said pendulum stem with its loaded disc as a gravity pestle and said resilient cage mutually yieldingly resistant to the birds in feeding, may coactively buffet the enclosed feed.

10. A pensile poultry feeder for automatic service presentation of mashes or like mixes to poultry feeding from ground stances, comprising an open bottom, foraminous cage having a resilient feeding wall, means for pivotally and eccentrically supporting the cage, a pendulum clapper-stem freely suspended at its upper end above the cage top and extending freely centrally through the cage, and a pendulum disc member having a concaved upper surface and forming a shallow feed delivery having a rounded edge, and rigidly fixed on the lower end of the stem so as to be freely movable relative to the bottom cage edge and to the point of suspension, whereby said pendulum stem with its loaded disc as a gravity pestle and said resilient cage mutually yieldingly resistant to the birds in feeding, may coactively buffet the enclosed feed, and a relatively impervious outer casing clamped about the foraminous cage wall and adjustable relative to the bottom edge area thereof.

11. A pensile poultry feeder for automatic service presentation of mashes or like mixes to poultry feeding from ground stances, comprising an open bottom, foraminous cage having a resilient feeding wall, means for pivotally and eccentrically supporting the cage, a pendulum clapper-stem freely suspended at its upper end above the cage top and extending freely centrally axially through the cage, and a pendulum disc having a spherically concaved upper surface, said surface having shallow spaced radial grooves forming a shallow feed delivery, a central hollow boss fixed on the lower end of the stem so as to be freely movable relative to the bottom cage edge and to the point of suspension, whereby said pendulum stem with its loaded disc as a gravity pestle and said resilient cage mutually yieldingly resistant to the birds in feeding, may coactively buffet the enclosed feed.

12. A pensile poultry feeder comprising an open bottomed foraminous cage, means for pivotally supporting the cage, a pendulum clapper-stem freely suspended at its upper end above the cage top and extending freely axially through the cage, a shallow feed pan fixed on the lower end of said stem, said pendulum stem with the attached feed pan and said cage being each yieldingly resistant to the attack of the feeding birds so as to coactively buffet the enclosed feed.

13. The feeder of claim 12 in which the cage is vertically adjustable relative to the feed pan and the stem.

14. A pensile poultry feeder comprising an open bottomed foraminous cage, means for pivotally supporting the cage, a pendulum clapper-stem freely suspended at its upper end above the cage top and extending freely axially through the cage, a shallow feed pan fixed on the lower end of said stem, said stem with the attached feed pan and said cage being each yieldingly resistant to the attack of the feeding birds so as to coactively buffet the enclosed feed, and a second wall for said cage.

15. The feeder of claim 14 in which the second wall is removable and adjustable.

16. The feeder of claim 12 in which the feed pan is of greater diameter than the cage and is designed to prevent the loss of feed over its edge.

17. The feeder of claim 12 in which the feed pan comprises means deterring the feed from accumulating near its edge and being lost therefrom.

18. A pensile poultry feeder comprising an open bottomed foraminous cage, means for pivotally supporting the cage, a pendulum clapper-stem freely suspended at its upper end above the cage top and extending freely axially through the cage, a shallow feed pan fixed on the lower end of said stem, a boss in the center of the feed pan adapted to receive the lower end of the clapper stem, said stem with the attached feed pan and said cage being each yieldingly resistant to the attack of the feeding birds so as to coactively buffet the enclosed feed.

MARTYN L. HALL.